US009977967B2

(12) United States Patent
Umezaki et al.

(10) Patent No.: US 9,977,967 B2
(45) Date of Patent: May 22, 2018

(54) OBJECT DETECTION DEVICE FOR RECOGNIZING AN OBJECT IN AN INPUT FRAME IMAGE USING DETECTION HISTORY INFORMATION

(71) Applicant: MegaChips Corporation, Osaka-shi (JP)

(72) Inventors: Taizo Umezaki, Aichi (JP); Yuki Haraguchi, Osaka (JP); Hiromu Hasegawa, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 0 days. days.

(21) Appl. No.: 15/486,807

(22) Filed: Apr. 13, 2017

(65) Prior Publication Data

US 2017/0220868 A1    Aug. 3, 2017

Related U.S. Application Data

(62) Division of application No. 14/388,017, filed as application No. PCT/JP2013/054136 on Feb. 20, 2013, now Pat. No. 9,652,677.

(30) Foreign Application Priority Data

Mar. 30, 2012  (JP) .................................. 2012-078759

(51) Int. Cl.
*G06K 9/00*     (2006.01)
*G06T 7/215*    (2017.01)

(52) U.S. Cl.
CPC .......... *G06K 9/00744* (2013.01); *G06T 7/215* (2017.01)

(58) Field of Classification Search
None
See application file for complete search history.

(56) References Cited

U.S. PATENT DOCUMENTS 6,404,455 B1 *  6/2002  Ito .................... G08B 13/19602
                                                    348/169
6,445,409 B1 *  9/2002  Ito .......................... G01S 3/783
                                                    348/155

(Continued)

FOREIGN PATENT DOCUMENTS

JP  2000-105835   4/2000
JP  2005-354578   12/2005

(Continued)

OTHER PUBLICATIONS

International Search Report dated Mar. 26, 2013, in International Application No. PCT/JP2013/054136.

(Continued)

*Primary Examiner* — Matthew Bella
*Assistant Examiner* — Soo Shin
(74) *Attorney, Agent, or Firm* — Oblon, McClelland, Maier & Neustadt, L.L.P.

(57) ABSTRACT

The object detection device 1 detects an object being recognized (such as a pedestrian) in a frame image 42, and identifies an area 42a where a detected object which is detected in the frame image 42 is present. A frame image 43 is input after the frame image 42. The object detection device 1 detects the object being recognized in the frame image 43, and identifies an area 43a where a detected object which is detected in the frame image 43 is present. When a distance from center coordinates 42b of the area 42a to center coordinates 43b of the area 43a is smaller than a reference distance, the object detection device 1 determines that the detected object which is detected in the frame image 43 is identical to the detected object which is detected in the frame image 42.

4 Claims, 8 Drawing Sheets

(56) References Cited

U.S. PATENT DOCUMENTS

| | | | |
|---|---|---|---|
| 7,940,956 B2 * | 5/2011 | Kinoshita | G01S 3/7864 348/169 |
| 2005/0175219 A1 * | 8/2005 | Yang | G06K 9/3241 382/103 |
| 2007/0253596 A1 * | 11/2007 | Murata | G06K 9/6203 382/103 |

FOREIGN PATENT DOCUMENTS

| | | |
|---|---|---|
| JP | 2007-042072 | 2/2007 |
| JP | 2009-070344 | 4/2009 |

OTHER PUBLICATIONS

Office Action dated Feb. 2, 2016 in Japanese Patent Application No. 2012-078759 (with English translation).

Yang et al., "Context-Aware Visual Tracking," IEEE Transactions on Pattern Analysis and Machine Intelligence, vol. 31, No. 7. Jul. 2009.

* cited by examiner

DETECTION HISTORY INFORMATION2

| FRAME NUMBER | COORDINATES | LIKELIHOOD VALUE | DISTANCE | TRACKING FLAG |
|---|---|---|---|---|
| 42 | (233, 105) | 357 | | |
| 43 | (228, 104) | 364 | 5.1 | 1 |
| 44 | (223, 103) | | | 1 |
| 45 | (217, 107) | 341 | 3.2 | 1 |

DETECTION HISTORY INFORMATION2

| FRAME NUMBER | COORDINATES | LIKELIHOOD VALUE | DISTANCE | TRACKING FLAG |
|---|---|---|---|---|
| 42 | (233, 105) | 357 | | |
| 43 | (228, 104) | 364 | 5.1 | 1 |
| 45 | (220, 102) | 341 | 8.2 | 1 |

OBJECT DETECTION DEVICE FOR RECOGNIZING AN OBJECT IN AN INPUT FRAME IMAGE USING DETECTION HISTORY INFORMATION

CROSS-REFERENCE TO RELATED APPLICATIONS

This application is a divisional of application Ser. No. 14/388,017, filed Sep. 25, 2014, which is a national phase application of International Application No. PCT/JP2013/054136, filed Feb. 20, 2013, and claims priority to Japanese Application No. 2012-078759, filed Mar. 30, 2012, the entire contents of which are incorporated herein by reference.

TECHNICAL FIELD

The present invention relates to an object detection device for detecting an object being recognized in an input frame image.

BACKGROUND ART

There is an object detection device which detects an object being recognized such as a person, in an image shot by a camera. The object detection device is mounted into a vehicle, together with a camera, for example. The object detection device can inform a driver of presence of a pedestrian when the pedestrian is detected in an image shot by the camera.

An image recognition apparatus according to Patent Document 1 detects a degree of pattern matching by carrying out a pattern matching process on a search window which is cut out from an input image. Since the search window is set such that the search window and a partial area of another search window overlap each other, there is provided an area where a pattern matching process is carried out plural times. In the area where a pattern matching process is carried out plural times, respective degrees which are calculated in the respective pattern matching processes are integrated, so that a position of an object being recognized can be detected with high precision.

An object detecting/tracing apparatus according to Patent Document 2 extracts a potential area where an object is likely to be present from image data, and traces the potential area. The object detecting/tracing apparatus according to Patent Document 2 carries out processes for detecting an object in the potential area, on the predetermined number of pieces of image data, after starting tracing. A total sum of results of detection in the predetermined number of pieces of image data is employed as a result of detection in a subsequent image data which is to be input after the predetermined number of pieces of image data.

Patent Document 1: Japanese Patent Application Publication No. 2009-70344

Patent Document 2: Japanese Patent Application Publication No. 2005-354578

The image recognition apparatus according to Patent Document 1 detects an object being recognized using only pixel data of input image. However, in some cases, features of the object being recognized cannot be satisfactorily extracted from the input image when conditions for shooting change due to mixing of noises or change in the object (changes in orientation or posture). In such cases, although the object being recognized is included in the input image, the object being recognized may be un-detected in the input image. Or, a different thing from the object being recognized may be erroneously detected as the object being recognized.

The object detecting/tracking device according to Patent Document 2 causes results of detection in the predetermined number of pieces of image data to be reflected in a result of detection in the subsequent image data. The results of detection in the predetermined number of pieces of image data are not revised. Accordingly, if erroneous detection occurs in the predetermined number of pieces of image data, there will arise a problematic situation where an erroneous result of detection is kept displayed together with the subsequent image data.

DISCLOSURE OF INVENTION

An object detection device according to the present invention includes: an image recognition unit configured to detect an object being recognized in an input frame image, and identify a position of a detected object which is detected as the object being recognized in the input frame image, a storage unit configured to store a position of a first past detected object which is detected as the object being recognized in a first past frame image which is input immediately before the input frame image, a distance calculation unit configured to calculate a first distance from the position of the first past detected object to the position of the detected object which is detected in the input frame image; and a first determination unit configured to determine that the detected object which is detected in the input frame image is identical to the first past detected object if the first distance is smaller than a first reference distance which is previously set.

A result of detection of the object being recognized in the input frame image can be changed in accordance with a result of detection in the first past frame image, so that a rate of detecting the object being recognized can be improved.

Also, in the object detection device according to the present invention, the storage unit holds detection history information which indicates whether or not the first past detected object is identical to a second past detected object which is detected in a second past frame image which is input immediately before the first past frame, and the object detection device further includes a second determination unit configured to determine whether or not the first past detected object is identical to the second past detected object by referring to the detection history information when the object being recognized is not detected in the input frame image, and determine that the same object as the first detected object is present in the input frame image if the first past detected object is identical to the second past detected object.

Even in a case where the object being recognized is not detected in the input frame image although the input frame image includes the object being recognized, it can be determined that the object being recognized is present in the input frame image, so that a detection rate can be further improved.

Also, in the object detection device according to the present invention further includes a frame picking unit configured to pick a frame image in which the object being recognized is detected, from the first predetermined number of past frame images which are input before the input frame image when the first past detected object is not detected in the first past frame image, wherein the distance calculation unit calculates a second distance from the position of the detected object which is detected in the input frame image to a position of a detected object which is detected in the frame image picked by the frame picking unit, and the first determination unit determines that the detected object which is detected in the input frame image is identical to the detected object which is detected in the picked frame image if the second distance is smaller than a second reference distance.

It can be determined whether or not the detected object which is detected in the input frame image is detected continuously from the past frame image, so that a detection rate can be further improved.

Therefore, an objective of the present invention is to provide an object detection device which can improve a rate of detecting an object being recognized.

These and other objectives, features, aspects and advantages of the present invention will become more apparent from the following detailed description of the present invention when taken in conjunction with the accompanying drawings.

BEST MODE FOR CARRYING OUT THE INVENTION

Below, preferred embodiments of the present invention will be described with reference to accompanying drawings.

First Preferred Embodiment (1. Structure of Object Detection Device)

Figure 1:
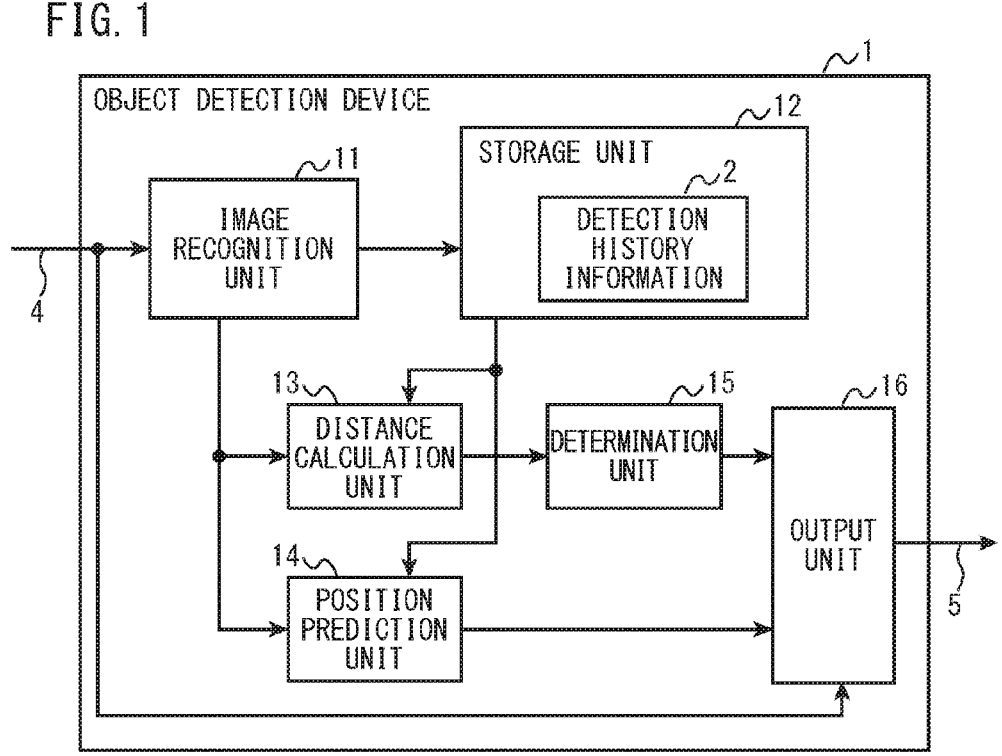
FIG. 1 is a functional block diagram showing a structure of an object detection device according to a first preferred embodiment of the present invention.

FIG. 1 is a functional block diagram showing a structure of an object detection device 1. As shown in FIG. 1, the object detection device 1 is mounted into a vehicle such as an automobile, receives a frame image 4 input from a camera (not shown) which shoots a view ahead of the automobile, and detects a pedestrian in the input frame image 4.

The object detection device 1 produces indicative data 5 in which a result of detection is reflected in the frame image 4. More specifically, the object detection device 1 puts a rectangular box in an area within the frame image 4, where a pedestrian is detected, to thereby produce the indicative data 5 in which a position of the pedestrian is highlighted. The indicative data 5 is displayed on a monitor not shown.

The object detection device 1 includes an image recognition unit 11, a storage unit 12, a distance calculation unit 13, a position prediction unit 14, a determination unit 15, and an output unit 16.

The image recognition unit 11 uses previously-set pattern data of an object being recognized (pedestrian) in detecting the object being recognized in the frame image 4. For detection of the object being recognized, image recognition algorithms such as neural network and a support vector machine are employed. When the image recognition unit 11 detects the object being recognized in each of the frame images 4, the image recognition unit 11 records a position and the like of a detected object which is detected as the object being recognized in each of the frame images 4, on detection history information 2.

The storage unit 12 is a volatile storage medium such as a random access memory (RAM), for example, and holds the detection history information 2. Note that the storage unit 12 may be a non-volatile storage medium such as a hard disk drive (HDD).

The distance calculation unit 13 calculates a distance from a position of a detected object in the frame image 4 which has been ever input (past frame image) to a position of a detected object in the input frame image 4 which has been input most recently (input frame image).

The position prediction unit 14 predicts a position of a detected object in an input frame image based on a position of a detected object which is detected in a past frame image, if the object being recognized is not detected in the input frame image.

The determination unit 15 determines whether or not a detected object in an input frame image and a detected object in a past frame image are identical to each other, by using a distance calculated by the distance calculation unit 13. The determination unit 15 determines that the detected object in the past frame image is traced in an input frame image if the detected object in the input frame image and the detected object in the past frame image are identical to each other.

The output unit 16 produces the indicative data 5 by superimposing a rectangular box indicating a position of a detected object on an input frame image if the determination unit 15 determines that the detected object in the past frame image is traced in the input frame image. The indicative data 5 is output to the monitor from the output unit 16.

(2. Overview of Operations of Object Detection Device 1)

The object detection device 1 carries out a tracking process for determining whether or not a detected object in a past frame image is tracked in an input frame image. Below, an overview of a tracking process will be provided with reference to FIG. 2.

Figure 2:
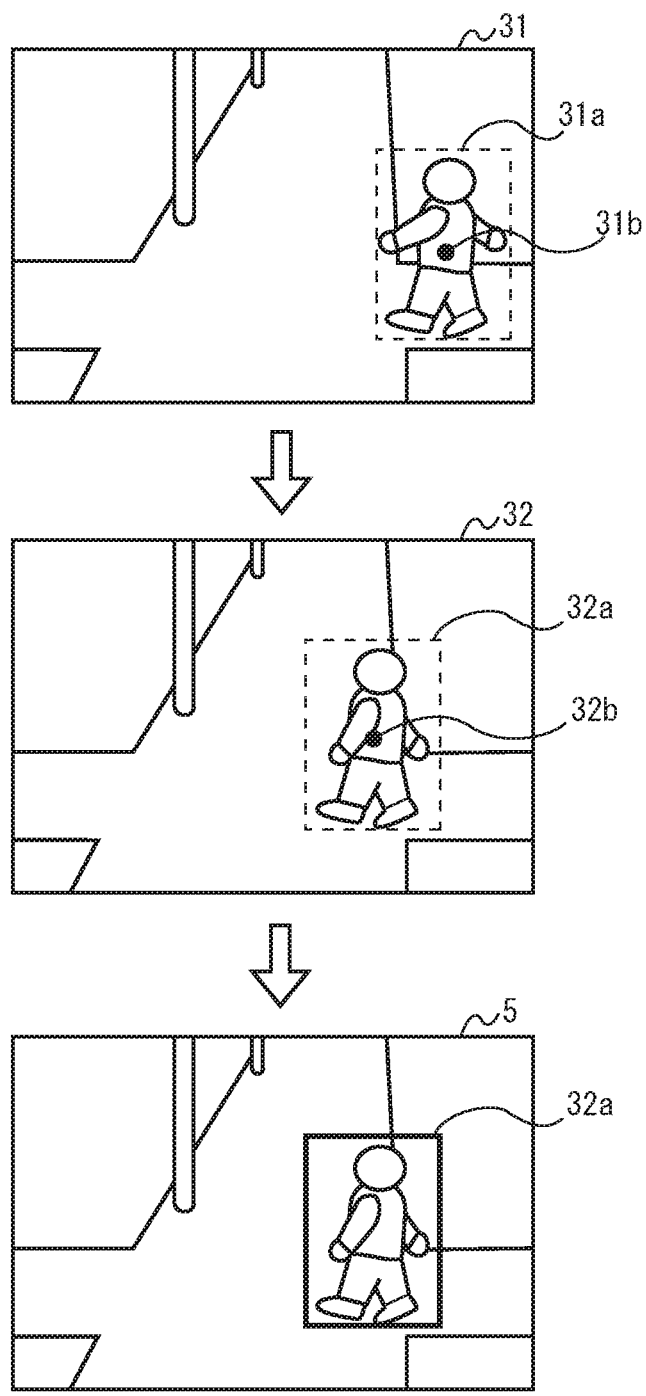
FIG. 2 includes views showing frame images which are input to the object detection device shown in FIG. 1.

FIG. 2 includes views showing frame images 31 and 32 which are input to the object detection device 1. The object detection device 1 receives the frame image 31. The object detection device 1 identifies an area 31a where a pedestrian is present by carrying out a pattern matching process. At the time when the area 31a is identified, the object detection device 1 does not produce the indicative data 5 in which the area 31a is highlighted. Thus, the object detection device 1 outputs the frame image 31 which is not processed in any way, as the indicative data 5.

Next, the object detection device 1 receives the frame image 32. The object detection device 1 identifies an area 32a where a pedestrian is present. The object detection device 1 determines that the pedestrian within the area 31a and the pedestrian within the area 32a are identical to each other if a distance between center coordinates 31b of the area 31a and center coordinates 32b of the area 32a is smaller than a reference distance which is previously set. That is, the object detection device 1 determines that the pedestrian detected in the frame image 31 is being successfully tracked in the frame image 32. The object detection device 1 produces the indicative data 5 by enclosing the area 32a in the frame image 32 with a thick solid line.

In the above-described manner, if a detected object which is detected in an immediately preceding past frame image is being successfully tracked in an input frame image, the object detection device 1 determines that a detected object in the input frame image is a proper object being recognized. The object detection device 1 takes a result of detection in a past frame image into account, so that accuracy in detecting an object being recognized in an input frame image can be improved.

(3. Details of Tracking Process)

Figure 3:
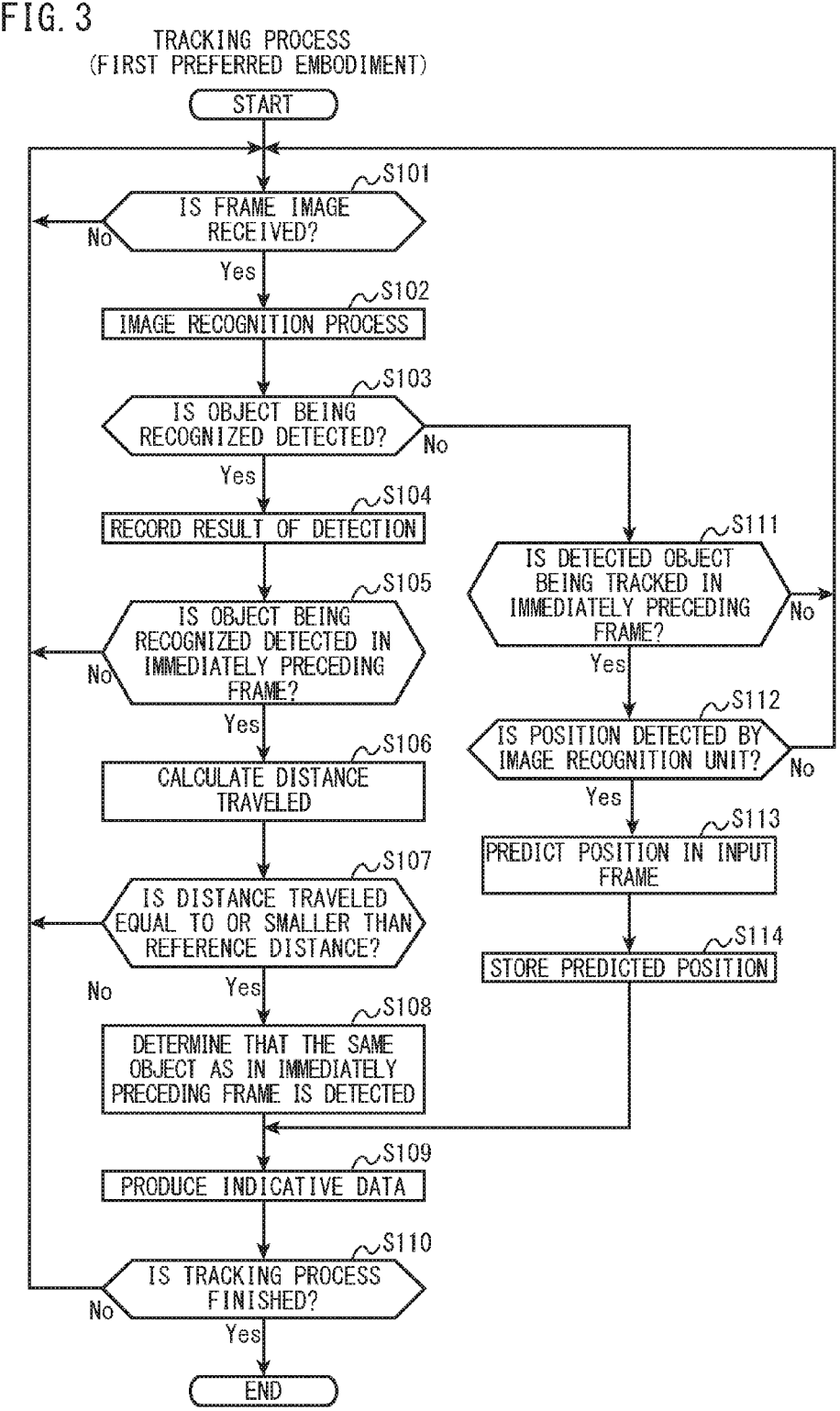
FIG. 3 is a flow chart showing operations of the object detection device shown in FIG. 1.
Figure 4:
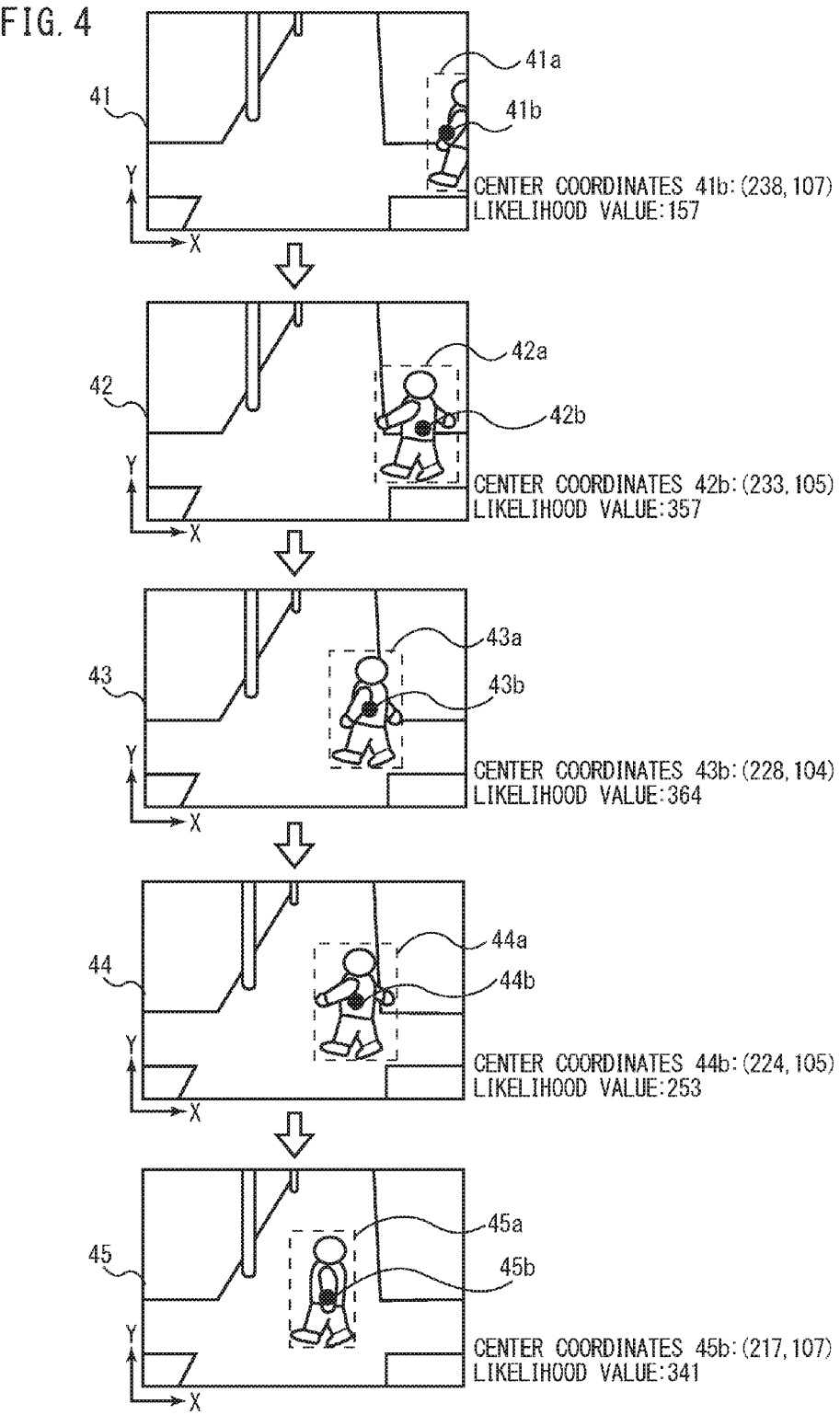
FIG. 4 includes views showing another frame images which are input to the object detection device shown in FIG. 1.
Figures 5, 6:
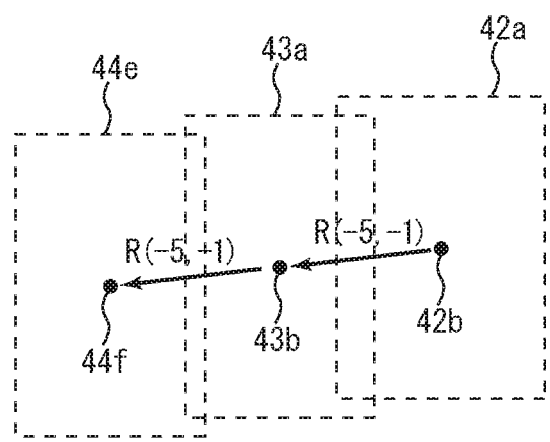
FIG. 5 is a table indicating detection history information shown in FIG. 1.
FIG. 6 is a view showing operations of a position prediction unit shown in FIG. 1.

Hereinafter, a tracking process will be described in detail with reference to FIGS. 3, 4, and 5. FIG. 3 is a flow chart of a tracking process that the object detection device 1 carries out. FIG. 4 includes views showing another frame images which are input to the object detection device 1. FIG. 5 is a table showing contents of the detection history information 2.

(Case where a Pedestrian can be Tracked)

The image recognition unit 11 detects a pedestrian in each of frame images 42, 43, and 45, but does not detect a pedestrian in each of frame images 41 and 44. Below, the operations of the object detection device 1 will be described when each of the frame images is input.

First, the object detection device 1 receives the frame image 41 from the camera ("Yes" in step S101). The frame image 41 includes a part of a pedestrian. The image recognition unit 11 carries out an image recognition process for detecting a pedestrian in the frame image 41 using pattern data (step S102). The pattern data is data indicating features of the pedestrian, and is previously set in the image recognition unit 11.

As a result of the step S102, the image recognition unit 11 extracts an area 41a from the frame image 41, and calculates "157" as a degree at which an image within the area 41a matches the pedestrian (likelihood value). Let us assume that the minimum of a likelihood value is "1" and the maximum thereof is "512". As a likelihood value becomes larger, a possibility that an image within an extracted area is a pedestrian is stronger. In FIG. 4, center coordinates 41b of the area 41a are expressed in units of pixel.

The image recognition unit 11 compares the likelihood value of the area 41a with a detection threshold value which is previously set, to thereby determine whether or not a pedestrian is detected in the frame image 41 (step S103). The detection threshold value is assumed to be "300". Since the likelihood value of the area 41a is smaller than 300, the image recognition unit 11 determines that no pedestrian is detected in the frame image 41 ("No" in step S103), and the process flow goes to a step S11.

The object detection device 1 determines whether or not a pedestrian is being tracked in an immediately preceding past frame image (step S111). Since no frame image is input before the frame image 41, the object detection device 1 determines that a pedestrian is not tracked in a past frame image ("No" in step S11), and returns back to the step S101. In this case, the frame image 41 which is not processed in any way is displayed on the monitor, as the indicative data 5.

Secondly, the object detection device 1 receives the frame image 42 ("Yes" in step S102). The frame image 42 includes a pedestrian. As a result of an image recognition process (step S102), an area 42a is extracted, and a likelihood value of the area 42a, "357", is calculated.

Since the likelihood value of the area 42a is larger than the detection threshold value, the image recognition unit 11 determines that a pedestrian is detected in the frame image 42 ("Yes" in step S103). Center coordinates 42b and the likelihood value of the area 42a are recorded on the detection history information 2 (step S104). In FIG. 5, respective reference numbers of frames are used as numbers for uniquely identifying the frames for the sake of convenience. Regarding a distance and a tracking flag shown in FIG. 5, description will be later provided.

The object detection device 1 refers to the detection history information 2, to determine whether or not a pedestrian is detected in an immediately preceding past frame image (i.e., the frame image 41) (step S105). Since a result of detection in the frame image 41 is not recorded on the detection history information 2, No pedestrian is detected in the frame image 41 ("No" in step S105). The object detection device 1 determines that tracing is not achieved in the frame image 42, and returns back to the step S101. The frame image 42 which is not processed in any way is displayed on the monitor, as the indicative data 5, with the area 42a not being enclosed by a thick solid line.

Then, the object detection device 1 receives the frame image 43 ("Yes" in step S101). The frame image 43 includes a pedestrian. As a result of an image recognition process (step S102), the area 43a is extracted, and a likelihood value of the area 43a, "364", is calculated.

Since the likelihood value of the area 43a is larger than the detection threshold value, the image recognition unit 11 determines that a pedestrian is detected in the frame image 43 ("Yes" in step S103). Center coordinates 43b and the likelihood value of the area 43a are recorded on the detection history information 2 (step S104).

Since a pedestrian is detected in an immediately preceding past frame image (i.e., the frame image 42) ("Yes" in step S105), the distance calculation unit 13 calculates a distance from a position where the pedestrian is detected in the frame image 42 to a position where the pedestrian is detected in the frame image 43 (step S106). More specifically, a distance between the center coordinates 42b and the center coordinates 43b (which will be hereinafter referred to as a "distance traveled") is calculated as Euclidean distance. A distance traveled, "5.1" as calculated is recorded on the detection history information 2, being put in a row of a frame number, "42".

The determination unit 15 determines whether or not the calculated distance traveled is equal to or smaller than a reference distance (10 pixels) which is previously fixed (step S107). The reference distance is fixed in consideration of a typical speed of a pedestrian. Note that the object detection device 1 can obtain a travel speed of the vehicle into which the camera and the object detection device 1 are mounted, and revise the fixed reference distance based on the obtained travel speed. The reason for this is that an apparent speed of the pedestrian as viewed from the camera changes along with a travel speed of the vehicle.

As shown in FIG. 5, the distance traveled is "5.1", which is smaller than the reference distance ("Yes" in step S107). The determination unit 15 determines that the pedestrian in the area 42a and the pedestrian in the area 43a are identical to each other and the pedestrian detected in the frame image 42 is being successfully tracked in the frame image 43 (step S108). Then, "1" is recorded on the detection history information 2, as a tracking flag of the frame image 43. The tracking flag, "1", indicates that a pedestrian is tracked in the frame image 43. For the frame image 42, a box of a tracking flag is blank. This means that though the pedestrian is detected in the frame image 42, the pedestrian is not tracked in the frame image 42.

The output unit 16 produces the indicative data 5 by enclosing the area 43a in the frame image 43 with a thick solid line because the pedestrian is tracked in the frame image 43 (step S109). The indicative data 5 in which a position of the pedestrian is highlighted is displayed on the monitor. If the object detection device 1 continues to carry out the tracking process ("No" in step S110), the object detection device 1 returns back to the step S101.

On the other hand, in a case where the distance traveled is larger than the reference distance in the step S107 ("No" in step S107), the determination unit 15 determines that the pedestrian detected in the area 42a is not tracked in the frame image 43 because the pedestrian in the area 42a and the pedestrian in the area 43a are not identical to each other. In this case, the frame image 43 which is not processed in any way is displayed on the monitor, as the indicative data 5, with the area 43a not being enclosed by a thick solid line.

Then, the object detection device 1 receives the frame image 44 ("Yes" in step S101). The frame image 44 includes a pedestrian. As a result of an image recognition process (step S102), an area 44a is extracted, and a likelihood value of the area 44a, "253", is calculated.

Although the frame image 44 includes a pedestrian, the likelihood value of the area 44a is equal to or smaller than the detection threshold value ("300"). Hence, the object detection device 1 determines that no pedestrian is detected in the frame image 44 ("No" in step S103). The object detection device 1 cannot carry out the steps S105, S106, S107, and S108.

However, there is a possibility that the object detection device 1 could not recognize an image of the area 44a as a pedestrian accidentally because of change in conditions at the time of shooting the frame image 44. The object detection device 1 determines whether or not a pedestrian in tracked in the frame image 43 by referring to a tracking flag of the frame image 43 which is an immediately preceding frame image (step S111). Since the pedestrian is tracked in the frame image 43 ("Yes" in step S111), the object detection device 1 predicts that a pedestrian is tracked also in the frame image 44, in succession to the frame image 43.

The object detection device 1 determines whether or not a position of the pedestrian (the center coordinates 43b) in the frame image 43 which is an immediately preceding frame image is detected in the step S102 (step S112). Since the center coordinates 43b are detected by the image recognition unit 11 ("Yes" in step S112), the position prediction unit 14 predicts a position of the pedestrian in the frame image 44 based on the center coordinates 42b and 43b which are recorded on the detection history information 2 (step S113).

FIG. 6 is a view showing a method of predicting a position of a pedestrian. In FIG. 6, the areas 42a and 43a and a predicted area 44e are provided in the same plane and the center coordinates 42b, 43b, and 44f are provided in the same plane. The position prediction unit 14 calculates a relative position R of the center coordinates 43b with respect to the center coordinates 42b. The relative position R of the center coordinates 43b is "(−5, −1)". The position prediction unit 14 regards the relative position R with respect to the center coordinates 43b as center coordinates 44f of the predicted area 44e in the frame image 44. The predicted area 44e is an area where a pedestrian is expected to be present in the frame image 44. The predicted area 44e may be non-identical to the area 44a in some cases.

The object detection device 1 records the center coordinates 44f on the detection history information 2 as a parameter indicating an area where a pedestrian is detected in the frame image 44 (step S114). The object detection device 1 determines that tracking is continued also in the frame image 44, and so, records "1" in a box of a tracking flag for the frame image 44. Since no pedestrian is detected in the frame image 44, neither a likelihood value nor a distance traveled for the frame image 44 is recorded on the detection history information 2. The output unit 16 outputs the frame image 44 in which the predicted area 44e is highlighted, to the monitor, as the indicative data 5 (step S109). The output unit 16 can employ a size of the area 43a of the frame image 43 which is an immediately preceding image, as a size of the predicted area 44e.

On the other hand, in a case where a position of a pedestrian in the immediately preceding image (frame image 43) is predicted by the position prediction unit 14 in the step S112 ("No" in step S112), the object detection device 1 does not predict a position of a pedestrian in the frame image 44, and returns back to the step S101. This is because to further predict a position of a pedestrian based on a predicted position of a pedestrian may possibly reduce a detection rate on the contrary. More specifically, if a frame image which does not include a pedestrian is input subsequent to the frame image 44, the position prediction unit 14 repeats a process of predicting a position of a pedestrian in a subsequent frame image (step S113), based on a predicted position of a pedestrian in a past frame image. As a result, although the frame image which does not include a pedestrian is input, the object detection device 1 is forced to keep determining that a pedestrian is tracked. However, to inhibit prediction of a position of a pedestrian in an input frame image in a case where a position of a pedestrian in an immediately preceding past frame image is predicted, could improve a detection rate.

Then, the object detection device 1 receives the frame image 45 ("Yes" in step S101). The frame image 45 includes a pedestrian. As a result of an image recognition process (step S102), an area 45a is extracted, and a likelihood value of the area 45a, "341", is calculated.

Since the likelihood value of the area 45a is larger than the detection threshold value, the image recognition unit 11 determines that a pedestrian is detected in the frame image 45 ("Yes" in step S103). Center coordinates 45b and the likelihood value of the area 45a are recorded on the detection history information 2 (step S104).

As described above, the object detection device 1 does not determine that a pedestrian is detected in the frame image 44 based on the likelihood value of the area 44a. Nonetheless, the object detection device 1 determines that tracing is achieved in the frame image 44 based on the result of detection in the frame image 43, as described above. In such a case, the image recognition unit 11 determines that an object being recognized is detected in the frame image 44 which is an immediately preceding frame image ("Yes" in step S105), and the distance calculation unit 13 calculates a distance traveled between the center coordinates 44f and the center coordinates 45b (step S106). Then, "3.2" is recorded on the detection history information 2, as a distance traveled.

The distance traveled, "3.2" is smaller than the reference distance ("Yes" in step S107), the determination unit 15 determines that tracing is continued also in the frame image 45 (step S108). The output unit 16 produces the indicative data 5 in which the area 45a is highlighted (step S109). Then, a tracing flag, "1" is recorded in a box for the frame image 45. Thereafter, the above-described processes are repeated until the whole tracing process is finished.

As is described above, in a case where the image recognition unit 11 does not detect a pedestrian in an input frame image, the object detection device 1 determines whether or not the condition of tracking is satisfied on an immediately preceding past frame image. If pedestrian is tracked in an immediately preceding past frame image, the object detection device 1 determines that a pedestrian is detected in an input frame image, irrespective of a result of detection provided by the image recognition unit 11. As a result of this, even in a case where a frame image in which no pedestrian is detected is accidentally provided while a pedestrian is kept detected, the object detection device 1 can determine that a pedestrian is detected in the frame image.

(Case where an Object which is not an Object being Recognized is Erroneously Detected)

Figure 7:
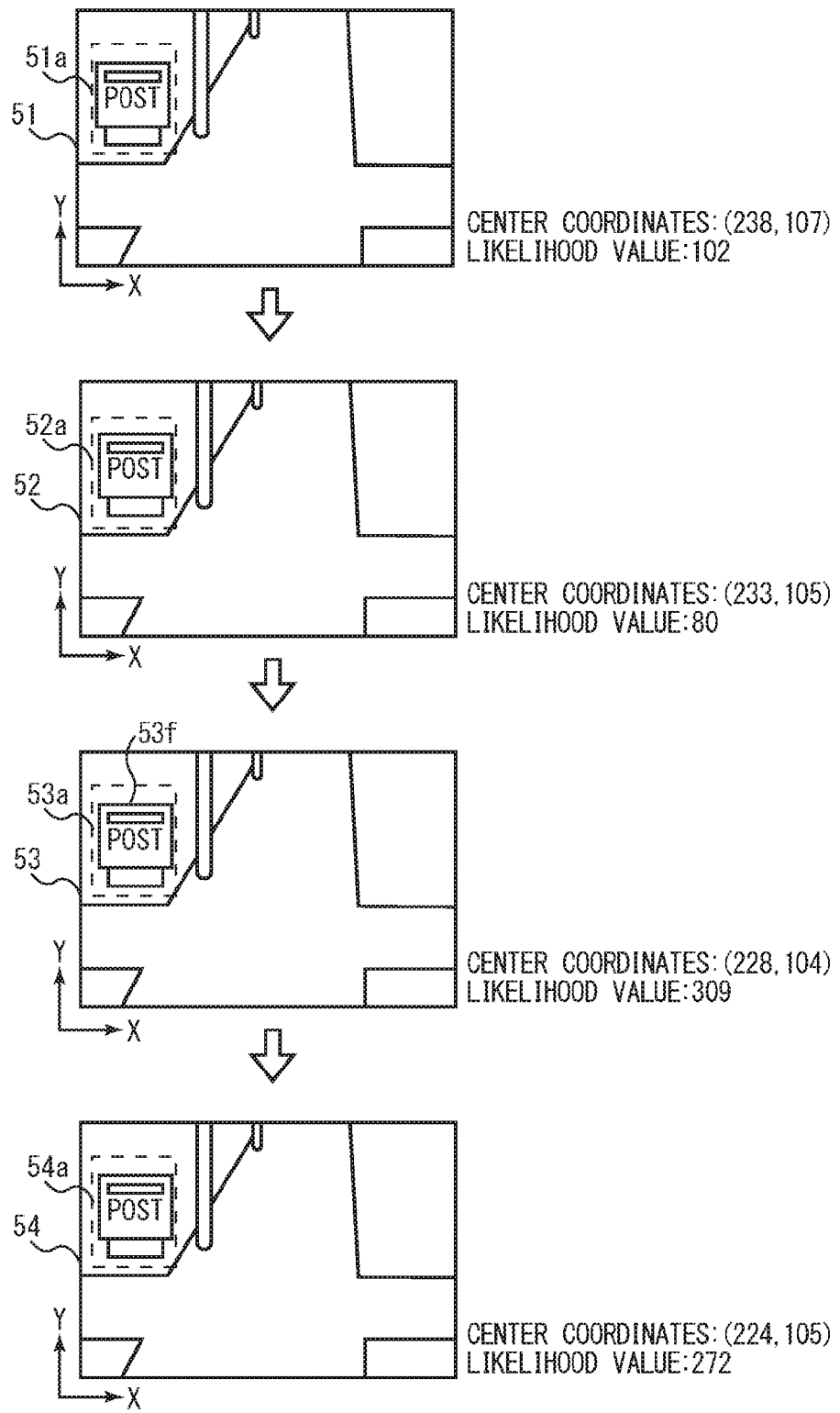
FIG. 7 includes views showing another different frame images which are input to the object detection device shown in FIG. 1.

FIG. 7 includes views respectively showing frame images 51, 52, 53, and 54 which are input to the object detection device 1. Each of the frame images 51, 52, 53, and 54 does not include a pedestrian. Let us assume that the image recognition unit 11 does not detect a pedestrian in each of the frame images 51, 52, and 54, but erroneously detects a mailbox 53f as a pedestrian in the frame image 53.

Below, a tracking process carried out when the mailbox 53f is detected as a pedestrian will be described in detail, with reference to FIGS. 3 and 7.

First, the object detection device 1 receives the frame image 51 ("Yes" in step S101). As a result of an image recognition process (step S102), an area 51a is extracted, and a likelihood value of the area 51a, "102", is calculated. Since the likelihood value of the area 51a is smaller than the detection threshold value ("300"), the image recognition unit 11 determines that no pedestrian is detected in the frame image 51 ("No" in step S103). There is no past frame image ("No" in step S111), so that the object detection device 1 returns back to the step S101.

The object detection device 1 receives the frame image 52 ("Yes" in step S101). As a result of an image recognition process (step S102), an area 52a is extracted, and a likelihood value of the area 52a, "80", is calculated. Since the likelihood value of the area 52a is smaller than the detection threshold value, the image recognition unit 11 determines that no pedestrian is detected in the frame image 52 ("No" in step S103). Since a pedestrian is not tracked in the frame image 51 which is an immediately preceding frame image ("No" in step S111), the object detection device 1 returns back to the step S101.

The object detection device 1 receives the frame image 53 ("Yes" in step S101). As result of an image recognition process (step S102), an area 53a is extracted, and a likelihood value of the area 53a, "309", is calculated. Since the likelihood value of the area 53a is equal to or larger than the detection threshold value, the image recognition unit 11 determines that a pedestrian is detected in the frame image 53 ("Yes" in step S103). However, since no pedestrian is detected in the frame image 52 which is an immediately preceding frame image ("No" in step S105), the object detection device 1 determines that condition of tracking is not satisfied in the frame image 53, and returns back to the step S101.

The object detection device 1 receives the frame image 54 ("Yes" in step S101). As a result of an image recognition process (step S102), an area 54a is extracted, and a likelihood value of the area 54a, "272", is calculated. Since the likelihood value of the area 54a is smaller than the detection threshold value, the image recognition unit 11 determines that no pedestrian is detected in the frame image 54 ("No" in step S103). Since a pedestrian is not tracked in the frame image 53 which is an immediately preceding frame image ("No" in step S111), the object detection device 1 returns back to the step 101.

As described above, the object detection device 1 refers to a result of detection in a past frame image, to ultimately determine whether or not a detected object is a pedestrian. Even if an object which is not a pedestrian is erroneously detected as a pedestrian, an area which is determined to include a pedestrian is not highlighted while being displayed. Thus, a rate of detecting a pedestrian can be improved.

It is additionally noted that though the position prediction unit 14 predicts a position of a pedestrian in the frame image 44 using of the center coordinates 42b and 43b in the step S113, the present invention is not limited to that. The position prediction unit 14 may determine that the area 44a is a position of a pedestrian if the center coordinates 44b of the area 44a meets a predetermined condition. Specifically, if a distance from the center coordinates 43b to the center coordinates 44b is smaller than the reference distance, the position prediction unit 14 determines that the area 44a is a position of a pedestrian.

Though an example in which whether or not a pedestrian is tracked in an immediately preceding past frame image is determined has been cited for the step S111, the present invention is not limited to that example. The object detection device 1 may determine whether or not a pedestrian is tracked in each of two or more immediately preceding past frame images. For example, in a case where no pedestrian is detected in the frame image 44, the object detection device 1 may determine whether or not tracing is achieved in both of the frame images 42 and 43 in the step S111.

Second Preferred Embodiment

Hereinafter, a second preferred embodiment of the present invention will be described. A structure of the object detection device 1 according to the second preferred embodiment is similar to that according to the first preferred embodiment. In the following description, differences from the above-described first preferred embodiment will be mainly discussed.

Principal differences in a tracking process from the first preferred embodiment lie in the following two respects. Firstly, in a case where an object being recognized is not detected in an immediately preceding past frame image, the object detection device 1 calculates a distance traveled using a past frame image which is earlier than the immediately preceding past frame image. Secondly, the object detection device 1 picks a certain number of past frame images, which number is identical to the number of referred frames, counting from an input frame image. If the number of frame images in each of which the same object is detected, out of an input frame image and picked past frame images, is equal to or larger than the criterion frame-number, the object detection device 1 determines that the condition of tracking is satisfied in the input frame image. The number of referred frames and the criterion frame-number are parameters which are previously set in the object detection device 1. It is assumed that both of the number of referred frames and the criterion frame-number are set at two. Note that the number of referred frames and the criterion frame-number may be different from each other.

(Case where a Pedestrian can be Traced)

A tracking process according to the second preferred embodiment will be described in detail, by taking a case where the frame images 41, 42, 43, 44, and 45 shown in FIG. 4 are input to the object detection device 1, as an example.

Figure 8:
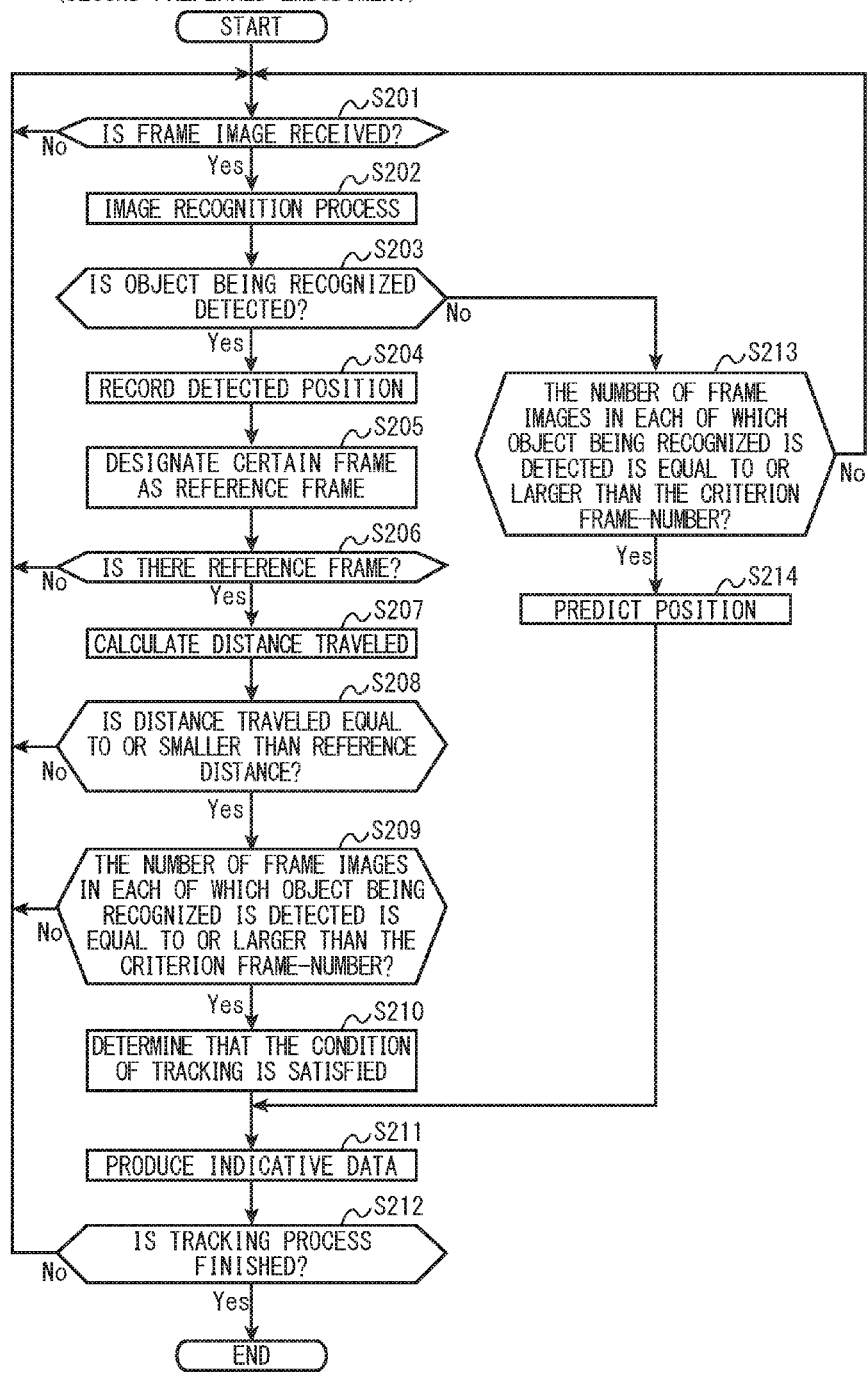
FIG. 8 is a flow chart showing operations of an object detection device according to a second preferred embodiment of the present invention.
Figures 9, 10:
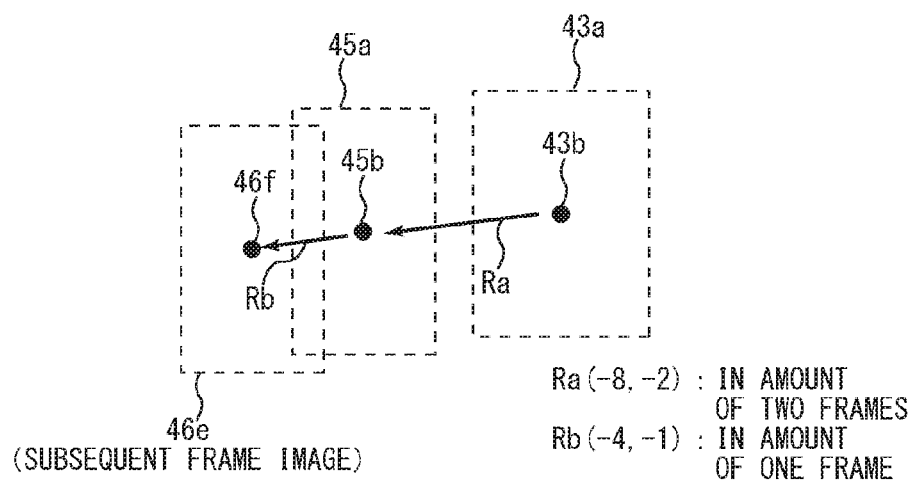
FIG. 9 is a table showing detection history information according to the second preferred embodiment of the present invention.
FIG. 10 is a view showing operations of a position prediction unit according to the second preferred embodiment of the present invention.

FIG. 8 is a flow chart of the tracking process that the object detection device 1 carries out according to the second preferred embodiment. FIG. 9 is a table showing the contents of the detection history information 2 according to the second preferred embodiment. In FIG. 8, steps S201, S202, S203, and S204 are identical to the steps S101, S102, S103, and S104, respectively (refer to FIG. 3).

The object detection device 1 receives the frame image 41 ("Yes" in step S201). As a result of an image recognition process (step S202), the area 41a is extracted, and the likelihood value of the area 41a, "157", is calculated. The image recognition unit 11 determines that no pedestrian is detected in the frame image 41 ("No" in step S203), and the process flow goes to step S213.

Since there is no past frame image where a pedestrian is detected, before the frame image 41 ("No" in step S213), the object detection device 1 returns back to the step S201. The details of the step S213 will be later provided. The frame image 41 which is not processed in any way is output as the indicative data 5, with the area 41a not being enclosed by a thick solid line.

Next, the object detection device 1 receives the frame image 42 ("Yes" in step S201). As a result of an image recognition process (step S202), the area 42a is extracted, and the likelihood value of the area 42a, "357", is calculated.

The object detection device 1 determines that a pedestrian is detected in the frame image 42 ("Yes" in step S203), and records the center coordinates 42b and the likelihood value of the area 42a on the detection history information 2 (step S204). The distance calculation unit 13 designates a certain frame image as a reference frame image which is used as a reference for calculation of a distance traveled (step S205). If a pedestrian is detected in an immediately preceding past frame image, the immediately preceding frame image is designated as a reference frame image. On the other hand, if no pedestrian is detected in an immediately preceding frame image, the distance calculation unit 13 designates any one of two immediately preceding past frame images as a reference frame image because the number of referred frames is two. More specifically, the distance calculation unit 13 picks a past frame image(s) where a pedestrian is detected, out of the two immediately preceding past frame images. Then, out of the picked past frame images, a past frame image which is most recently input to the object detection device 1 is designated as a reference frame image.

There is no past frame image where a pedestrian is detected, before the frame image 42, the object detection device 1 cannot designate any frame image as a reference frame image ("No" in step S206). The object detection device 1 outputs the frame image 42 which is not processed in any way as the indicative data 5, without enclosing the area 42a with a thick solid line, and returns back to the step S201.

Then, the object detection device 1 receives the frame image 43 ("Yes" in step S201). As a result of an image recognition process (step S202), the area 43a is extracted, and the likelihood value of the area 43a, "364", is calculated.

The object detection device 1 determines that a pedestrian is detected in the frame image 43 ("Yes" in step S203). The center coordinates 43b and the likelihood value of the area 43a are recorded on the detection history information 2 (step S204). Since a pedestrian is detected in the frame image 42 which is an immediately preceding frame image, the frame image 42 is designated as a reference frame image (step S205). The distance calculation unit 13 calculates a distance traveled from the center coordinates 42b to the center coordinates 43b (step S207) because the frame image 42 is designated as a reference frame image ("Yes" in step S206). As shown in FIG. 9, a distance traveled in the frame image 43 is "5.1". The step S207 includes the same process as included in the step S106 (refer to FIG. 3).

The determination 15 determines whether or not the calculated distance traveled is equal to or smaller than the reference distance (10 pixels) (step S208). Note that the reference distance changes depending on a position of a reference frame image in a time direction. A case where the reference distance changes will be later discussed.

Since the distance traveled is equal to or smaller than the reference distance ("Yes" in step S208), the determination unit 15 determines that a pedestrian in the frame image 42 is tracked in the frame image 43 if the condition set out in the step S209 is satisfied (step S210).

More specifically, the determination unit 15 picks two immediately preceding past frame images (frame images 41 and 42) because the number of referred frames is two, and finds out the number of frame images in each of which a pedestrian is detected, out of the frame images 41, 42, and 43. The number of frame images in each of which a pedestrian is detected (frame images 42 and 43) is equal to or larger than two (the criterion frame-number) ("Yes" in step S209). Hence, the object detection device 1 ultimately determines that a pedestrian detected in the frame image 42 is being successfully tracked in the frame image 43 (step S210).

Since the condition of tracking is satisfied in the frame image 43, the output unit 16 produces the indicative data 5 in which the area 43a is highlighted by enclosing the area 43a of the frame image 43 with a thick solid line (step S211). If the object detection device 1 continues to carry out the tracking process ("No" in step S212), the object detection device 1 returns back to the step S201.

Thereafter, the object detection device 1 receives the frame image 44 ("Yes" in step S201). As a result of an image recognition process (step S202), the area 44a is extracted, and the likelihood value of the area 44a, "253", is calculated.

The object detection device 1 determines that no pedestrian is detected in the frame image 44 ("No" in step S203). The object detection device 1 cannot carry out the steps S205 through S210 for the frame image 44. In such a case, the object detection device 1 determines that a pedestrian is tracked in the frame image 44 if the condition set out in the step S213 is satisfied.

The step S213 is similar to the above-described step S209. That is, the object detection device 1 picks two immediately preceding past frame images (frame images 42 and 43) because the number of referred frames is two. The object detection device 1 finds out the number of frame images in each of which a pedestrian is detected, out of the frame images 42, 43, and 44. Since the number of frame images in each of which a pedestrian is detected (frame images 42 and 43) is equal to or larger than the criterion frame-number ("Yes" in step S213), the object detection device 1 determines that the condition of tracking is satisfied in the frame image 44.

The position prediction unit 14 predicts a position of a pedestrian in the frame image 44 (predicated area 44e and center coordinates 44f) using the center coordinates 42b and 43b (step S214). The step S214 includes the same process as included in the step S113 shown in FIG. 1. As distinct from the above-described first preferred embodiment, there is no need of storing a predicted position of a pedestrian in the frame image 44 into the detection history information 2, after the step S214. This is because the object detection device 1 can calculate a distance traveled by using an earlier past frame image even if no pedestrian is detected in an immediately preceding past frame image.

The output unit 16 produces the indicative data 5 in which the predicted area 44e is highlighted (step S211), and outputs the indicative data 5 to the monitor.

Then, the object detection device 1 receives the frame image 45 ("Yes" in step S201). As a result of an image recognition process (step S202), the area 45a is extracted, and the likelihood value of the area 45a, "341", is calculated.

The object detection device 1 determines that a pedestrian is detected in the frame image 45 ("Yes" in step S203). The distance calculation unit 13 refers to the detection history information 2, to designate the frame image 43 as a reference frame image (step S205). This is because the frame image 43 is the most recent frame image where a pedestrian is detected, out of two immediately preceding frame images (frame images 43 and 44).

Since the frame image 43 is designated as a reference frame image ("Yes" in step S206), the distance calculation unit 13 calculates a distance traveled from the center coordinates 43b to the center coordinates 45b (step S207). The determination unit 15 determines whether or not the distance traveled is equal to or smaller than twice the reference distance (20 pixels) (step S208). The reference distance is determined on the assumption that an immediately preceding frame image is a reference frame. Thus, in a case where a reference frame image is not an immediately preceding frame image, the reference distance is adjusted in accordance with a position of the reference frame image relative to the frame image 45 in a time direction.

The distance traveled is "8.2 pixels" (refer to FIG. 9), which is smaller than twice the reference distance (20 pixels) ("Yes" in step S208). Since a pedestrian is detected in each of two frame images 43 and 45 out of the frame images 43, 44, and 45 ("Yes" in step S209), the determination unit 15 determines that a pedestrian detected in the frame image 43 is being traced in the frame image 45 (step S210). The output unit 16 produces the indicative data 5 in which the area 45a is highlighted, and outputs the indicative data 5 (step S211).

(Case where an Object which is not an Object being Recognized is Erroneously Detected)

Below, a case where the image recognition unit 11 erroneously detects an object which is not a pedestrian, as a pedestrian, will be described with reference to FIG. 7. The image recognition unit 11 does not detect a pedestrian in the frame images 51, 52, and 54, but detects the mailbox 53f in the frame image 53, as a pedestrian.

The object detection device 1 receives the frame image 51 ("Yes" in step S201), and does not detect a pedestrian in the frame image 51 ("No" in step S203). Since there is no past frame image in which a pedestrian is detected ("No" in step S213), the object detection device 1 returns back to the step S201. The object detection device 1 receives the frame image 52 ("Yes" in step S201), and carries out the processes which are similar to those carried out on the frame image 51, on the frame image 52. As a result, the output unit 16 outputs the frame images 51 and 52 which are not processed in any way to the monitor, as the indicative data 5, without enclosing the areas 51a and 52a with a thick solid line.

The object detection device 1 receives the frame image 53 ("Yes" in step S201). As a result of an image recognition process (step S202), the area 53a is extracted, and the likelihood value of the area 53a, "309", is calculated. The image recognition unit 11 determines that a pedestrian is detected in the frame image 53 ("Yes" in step S203). That is, the mailbox 53f is erroneously detected as a pedestrian. However, since no pedestrian is detected in two immediately preceding past frame images (frame images 51 and 52), the distance calculation unit 13 cannot designate any frame image as a reference frame image used for calculation of a distance traveled ("No" in step S206). Hence, the object detection device 1 determines that the condition of tracking is not satisfied in the frame image 53, and returns back to the step S201.

The object detection device 1 receives the frame image 54 ("Yes" in step S201), and does not detect a pedestrian in the frame image 54 ("No" in step S203). The object detection device 1 picks two immediately preceding past frame images (frame images 52 and 53) because the number of referred frames is two. The object detection device 1 determines that the frame images 52, 53, and 54 includes only one frame image where a pedestrian is detected (frame image 53) ("No" in step S213). The object detection device 1 determines that the condition of tracking is not satisfied in the frame image 54, and returns back to the step S201.

As described above, in the second preferred embodiment, the object detection device 1 picks two past frame images based on an input frame image in a case where the number of referred frames is two. When the number of frame images in each of which the same object is detected, out of the input frame image and the two past frame images, is equal to or larger than the criterion frame-number, the object detection device 1 determines that a pedestrian is tracked in the input frame image. In this way, determination as to whether or not the condition of tracking is satisfied in an input frame image is made by referring to a result of detection in a past frame image, which improves a rate of detecting an object being recognized.

(Processes in the Step S209 in a Case where the Number of Referred Frames is Three or More)

Hereinabove, the second preferred embodiment has been described by taking a case where the number of referred frames is set at "two", as an example. Now, processes in the step 209 in a case where each of the number of referred frames and the criterion frame-number is three, will be described. Let us assume that among the frame images 41, 42, 43, 44, and 45 shown in FIG. 4, a pedestrian is detected in each of the frame images 43 and 45, and no pedestrian is detected in the frame images 41, 42, and 44.

The object detection device 1 receives the frame image 45 ("Yes" in step S201). The object detection device 1 detects a pedestrian in the frame image 45 ("Yes" in step S203). The distance calculation unit 13 calculates a distance traveled from the center coordinates 43b to the center coordinates 45b (step S206). If the distance traveled is equal to or smaller than the reference distance ("Yes" in step S208), the determination unit 15 carries out the step S209.

The determination unit 15 picks the frame images 42, 43, and 44 because the number of referred frames is three.

Among the picked frame images 42 and 44 and the input frame image 45, a pedestrian is detected in each of the frame images 43 and 45. The number of frame images in each of which a pedestrian is detected is smaller than the criterion frame-number ("No" in step S209). In such a case, the determination unit 15 determines that the image recognition unit 11 erroneously detects a different thing from a pedestrian as a pedestrian in the input frame image (frame image 45), and returns back to the step S201. In this case, the output unit 16 outputs the frame image 45 which is not processed in any way, as the indicative data 5. Additionally, in a case where the processes in the step S209 are carried out on a frame image which is to be input after the frame image 45, the determination unit 15 counts the frame image 45 as a frame image where a pedestrian is detected.

(Position Prediction in a Case where the Number of Referred Frames is Three or More (Step S214))

Also, in a case where the number of referred frame is set at three or more, if a relative position is used as it is, the position prediction unit 14 may fail to predict a position of a pedestrian in a frame image in some cases (step S214). In such cases, the position prediction unit 14 adjusts a relative position, and then predicts a position of a pedestrian.

FIG. 10 is a view showing a method of predicting a position of a pedestrian in a case where the number of referred frames is set at three. In FIG. 10, the areas 43*a* and 45*a* and a predicted area 46*e* are provided in the same plane. The predicted area 46*e* covers a range in which a pedestrian is expected to be present in a subsequent frame image which is to be input subsequent to the frame image 45.

Below, processes carried out by the position prediction unit 14 for determining center coordinates 46*f* of the predicted area 46*e* by using the center coordinates 43*b* and 45*b* (step S214) in a case where no pedestrian is detected in the subsequent frame image, will be described.

Since the number of referred frames is three, the position prediction unit 14 picks three past frame images, i.e., the frame images 43, 44, and 45, based on the subsequent frame image. The position prediction unit 14 selects the frame images 43 and 45 in each of which a pedestrian is detected, from the frame images 43, 44, and 45, and obtains a relative position Ra of the center coordinates 45*b* with respect to the center coordinates 43*b*. The relative position Ra indicates movement of center coordinates across two frame images.

The position prediction unit 14 determines the center coordinates 46*f* by using the relative position Ra and the center coordinates 45*b*. The movement from the center coordinates 45*b* to the center coordinates 46*f* corresponds to one frame. Thus, the position prediction unit 14 calculates a relative position Rb which is obtained by halving each of an x-coordinate and a y-coordinate of the relative position R2. The position prediction unit 14 determines that coordinates of the relative position Rb with respect to the center coordinates 45*b* are the center coordinates 46*f*.

Meanwhile, unlike the case shown in FIG. 4, in a case where it is assumed that a pedestrian is detected in each of the frame images 43 and 44 and no pedestrian is detected in the frame image 45, the position prediction unit 14 selects the frame images 43 and 44, and then determines the relative position Ra. In this case, the relative position Ra indicates movement of center coordinates in an amount of one frame. On the other hand, the relative position Rb indicates movement of center coordinates in an amount of two frames. Thus, the relative position Rb can be calculated by doubling each of an x-coordinate and a y-coordinate of the relative position R1.

With regard to the steps S209 and S213 in the above-described second preferred embodiment, though an example in which whether or not the number of frame images in each of which a pedestrian is detected is equal to or larger than the criterion frame-number has been cited, the present invention is not limited to that example. For example, in the step S209, in a case where the number of referred frames is two, the determination unit 15 may determine whether or not a representative value obtained based on respective likelihood values of an input frame image and two immediately preceding past frame images exceeds a predetermined threshold value. If the representative value exceeds the predetermined threshold value, the determination unit 15 determines that tracing is achieved in the input frame image (step S210). As the representative value, a total sum of respective likelihood values, an average of respective likelihood values, or the like, can be employed. Similarly, in the step S213, if the representative value exceeds the predetermined threshold value, the object detection device 1 may predict a position of a pedestrian in the input frame image (step S214).

Other Preferred Embodiments

The object detection device 1 may carry out the tracking process shown in FIG. 3 and the tracking process shown in FIG. 8 in parallel. In such a case, the object detection device 1 determines whether or not a pedestrian is tracked in an input frame image based on a result provided by the tracking process shown in FIG. 3 and a result provided by the tracking process shown in FIG. 4. For example, the object detection device 1 may be designed so as to highlight an area of a detected object in an input frame image if it is determined that a pedestrian is tracked in the input frame image in both of the tracking process shown in FIG. 3 and the process shown in FIG. 8. Also, the object detection device 1 may be designed so as to highlight an area of a detected object in an input frame image if it is determined that tracing is achieved a pedestrian is tracked in the input frame image in either the tracking process shown in FIG. 3 or the tracking process shown in FIG. 8.

Further, a part or a whole of the object detection device according to the above-described preferred embodiments may be implemented as an integrated circuit (LSI, a system LSI, or the like, for example).

A part or a whole of processes of each of functional blocks according to the above-described preferred embodiments may be implemented by programs. Then, a part or a whole of processes of each of functional blocks according to the above-described preferred embodiments is carried out by a central processing unit (CPU) in a computer. Also, respective programs for carrying out the processes are stored in a memory such as a hard disk or a ROM, and are carried out after being read out by a ROM or a RAM.

Also, each of the processes according to the above-described preferred embodiments may be implemented by hardware or software (including a case where each of the processes is implemented by an operating system (OS) or middleware, or implemented together with a predetermined library). Further, each of the processes may be implemented by mixed processing of software and hardware. Additionally, it is needless to say that adjustment of timing for carrying out each of the processes is necessary in a case where the object detection device according to the above-described preferred embodiments is implemented by hardware. In the above-description of the preferred embodiments, details of adjustment of timing for various signals which are to be generated in actual design of hardware are omitted for the sake of convenience in description.

While the invention has been shown and described in detail, the foregoing description is in all aspects illustrative and not restrictive. It is therefore understood that numerous modifications and variations can be devised without departing from the scope of the invention.

The invention claimed is:

1. An object detection device, comprising:
   image recognition circuitry configured to detect an object being recognized in an input frame image, and identify a position of the detected object being recognized in the input frame image;
   circuitry configured to store a position of a first past detected object which is detected as an object being recognized in a first past frame image which is input immediately before the input frame image;
   distance calculation circuitry configured to calculate a first distance from the position of the first past detected object to the position of the detected object which is detected in the input frame image; and
   first determination circuitry configured to determine that the detected object which is detected in the input frame image is identical to the first past detected object when the first distance is smaller than a first reference distance which is previously set, wherein
   the circuitry holds detection history information which indicates whether or not the first past detected object is identical to a second past detected object which is detected in a second past frame image which is input immediately before the first past frame,
   the object detection device further comprising
   second determination circuitry configured to determine whether or not the first past detected object is identical to the second past detected object by referring to the detection history information when the object being recognized is not detected in the input frame image, and determine that a same object as the first past detected object is present in the input frame image when the first past detected object is identical to the second past detected object.

2. The object detection device according to claim 1, further comprising:
   position prediction circuitry configured to predict a position of the same object in the input frame image by using a relative position of the first past detected object with respect to the position of the second past detected object, when the second determination circuitry determines that the same object is present in the input frame image.

3. The object detection device according to claim 1, wherein
   the distance calculation circuitry calculates a provisional distance from the position of the first past detected object to a position of an object which is extracted by the image recognition circuitry as a candidate for the object being recognized in the input frame image when the second determination circuitry determines that the same object is present in the input frame image,
   the object detection device further comprising
   position prediction circuitry configured to predict that the position of the extracted object is the position of the same object when the provisional distance is smaller than the first reference distance.

4. The object detection device according to claim 2, wherein
   the image recognition circuitry detects the object being recognized in a subsequent frame image which is to be input subsequent to the input frame image, and identifies a position of a subsequent detected object which is detected as the object being recognized in the subsequent frame image,
   the distance calculation circuitry calculates a second distance from the position predicted by the position prediction circuitry to the position of the subsequent detected object, and
   the first determination circuitry determines that the subsequent detected object is identical to the first past detected object when the second distance is smaller than the first reference distance.

* * * * *